US006969476B2

(12) United States Patent
Sandqvist

(10) Patent No.: US 6,969,476 B2
(45) Date of Patent: *Nov. 29, 2005

(54) METHOD FOR CASTING A CONCRETE PRODUCT

(75) Inventor: Leo Sandqvist, Forssa (FI)

(73) Assignee: Consolis Technology Oy Ab, Vantaa (FI)

( * ) Notice: Subject to any disclaimer, the term of this patent is extended or adjusted under 35 U.S.C. 154(b) by 290 days.

This patent is subject to a terminal disclaimer.

(21) Appl. No.: 10/395,216

(22) Filed: Mar. 25, 2003

(65) Prior Publication Data

US 2003/0189265 A1 Oct. 9, 2003

(30) Foreign Application Priority Data

Apr. 8, 2002 (FI) ................................ 20020661

(51) Int. Cl.[7] ............................ B28B 3/22; B28B 3/20; B28B 13/02; B29C 39/14; B29C 39/44

(52) U.S. Cl. ......................... 264/33; 264/34; 264/40.1; 264/40.4; 264/209.1; 264/211.11; 264/333; 425/62; 425/63; 425/64; 425/145; 425/147; 425/148

(58) Field of Search ........................... 264/33, 34, 40.1, 264/40.4, 333, 209.1, 211.11; 425/62, 63, 425/64, 145, 147, 148

(56) References Cited

U.S. PATENT DOCUMENTS 2,607,579 A * 8/1952 Noble ........................ 177/249
3,292,227 A * 12/1966 Olds .......................... 425/214
3,429,130 A * 2/1969 Feiner et al. ............... 405/116
3,608,011 A * 9/1971 Jones .......................... 264/70
3,623,708 A * 11/1971 Futty et al. .............. 366/156.1
4,073,592 A * 2/1978 Godberson et al. ........... 404/82
4,310,293 A * 1/1982 Eggleton ..................... 425/62
4,526,493 A * 7/1985 Hall et al. .................. 404/105
4,773,838 A * 9/1988 Seppanen .................... 425/63
5,023,030 A * 6/1991 Rantanen ................... 264/40.5
5,879,104 A * 3/1999 Ulrich ........................ 404/102

FOREIGN PATENT DOCUMENTS

DE 3502861 A 7/1986
FI 991165 A 11/2000
GB 2 302 817 A 2/1997
JP 06321611 A 11/1994
WO WO 00/71315 A1 11/2000

OTHER PUBLICATIONS

Derwent Abstract of DE 3502861 A; 1986; Derwent Information Limited; Derwent Week # 198632.*

* cited by examiner

*Primary Examiner*—Michael P. Conlaianni
*Assistant Examiner*—Michael I. Poe
(74) *Attorney, Agent, or Firm*—Buchanan Ingersoll PC

(57) ABSTRACT

A method is disclosed for casting a concrete product using two or more different grades of concrete mix, in which method predetermined amounts of different grades of concrete mix are delivered at appropriate instants into the feeder hopper of the slip-form casting machine.

2 Claims, 1 Drawing Sheet

METHOD FOR CASTING A CONCRETE PRODUCT

FIELD OF THE INVENTION

The invention relates to a method for casting prestressed concrete products by a continuous extrusion technique such that two or more different concrete mixes are laid on a casting bed with the help of auger feeders.

BACKGROUND OF THE INVENTION

In a continuously operating extruder, the concrete mix is extruded with the help of auger feeders into a mold or through nozzles, whereby the casting machine is propelled along the casting bed by the reaction forces imposed on the auger feeders. The ready-cast product remains on the casting bed. Conventionally, the casting operation over entire length of the long casting bed is arranged to occur according to the needs of that one of the individual pieces having the most stringent specifications in the entire casting run. Then, this specific slab dictates the pretensioning steel tendons, their pretension forces and the concrete mix grade to be used in the product. Resultingly, an extra high quantity of reinforcing steel and concrete mix of an unnecessarily high grade are wasted in many of the other slabs to be cut from the long slab cast on the bed. Such extra costs can be reduced, e.g., by way of using a concrete mix grade individually adjusted to meet the specifications of each product.

A single casting bed may also be used for casting concrete products of different quality grades by continuous extrusion if the casting machine is equipped with a compartmentalized feeder hopper, wherein the discharge of concrete mix from the compartments of the feeder hopper takes place controlled by casting length covered on the casting bed.

A two-compartment slip-form casting technique well known in the art is the so-called slideformer method, wherein two or three layers of concrete are cast atop one another in order to obtain a desired end product. All the concrete layers are fed from different feed hoppers and, generally, all the hoppers are filled with the same concrete mix grade. In exceptional cases, a different concrete grade such as suitable for making exposed aggregate products, for instance, is cast into either the bottom layer of the slab or the surface layer thereof. In the prior-art method, each one of the cast concrete mix layers is compacted separately.

In the method and apparatus described in FI Patent Application No. 991165 for manufacture of fiber-reinforced concrete products by extruder casting technique, a slip-form casting machine is disclosed having its feed hopper partitioned into at least two compartments and equipped with a control gate adapted to cover alternatingly as required the bottom discharge opening of either one of the two feed compartments. In this system, one compartment of the feed hopper contains standard-grade concrete mix, while the other compartment is filled with fiber-reinforced mix. In this fashion, the control gate of the feed hopper discharge openings can be controlled to adjust the feed ratio of the different concrete mixes so as to obtain a desired kind of end product. The primary function of this apparatus is to provide nonhomogeneous distribution of fiber reinforcement in the cross section of the end product.

SUMMARY OF THE INVENTION

The present invention now provides a novel type of casting method capable of continuously changing the grade of concrete mix during an on-going extrusion casting run, thus making it possible to cast concrete products having an optimized grade of concrete in their different portions. In the method according to the invention, the selected concrete mix grade is cast homogeneously at a given cross section of the product in the longitudinal direction of the casting bed.

The goal of the invention is attained by virtue of metering predetermined batches of different concrete mix grades into the feeder hopper of the slip-form casting machine at different instants of the slip-form casting run. Metering of the batches is adapted to take place controlled by the distance traveled in the casting run, whereby a desired concrete grade can be cast at any predetermined point of the casting bed. Hence, the metered feed of different concrete mix grades and properly timed delivery thereof results in a uniform casting outcome notwithstanding change of concrete mix grade during the casting run.

Hence, the concrete mix grade may be varied as desired, e.g., so that given ones of individual slabs cut from a long slab may be of a different concrete grade than that of the other slabs. Also different portions of a given slab may be made from different concrete mix grades, e.g., so that the ends of a given slab are fabricated from a different grade than that used for the middle portion of the slab. Generally, the most commonly used concrete mix grades different from the basic concrete mix grade can be a higher-strength or lower-strength grade, fiber-reinforced or colored concrete or the like.

Among others, the invention offers the following significant benefits:

- use of optimized-grade concrete gives savings in the consumption of extra amounts of cement and admixtures,
- use of a higher-grade or fiber-reinforced type of concrete mix allows additional reinforcing steels otherwise required for a given individual piece of slab to be omitted from the entire length of a raw slab being fabricated on the casting bed,
- balcony slabs can be cast from colored concrete thus making painting unnecessary during building erection, as well as later renovation painting, inasmuch as through-colored concrete grade can be used, and
- slabs to be provided with a great number of openings can be made from a special grade concrete to avoid cracking.

Furthermore, if there is a risk of exceeding the shear strength of long or heavily stressed slabs close to their support point, the end portion of the slab can be cast using concrete mix of a higher strength grade or, e.g., by fortifying the supported beam portion with fiber-reinforced concrete, whereby the shear strength of the slab increases thus making it possible to increase the load-bearing strength to a value specified for each individual trimmed slab. The shear strength of a slab may also become a limiting factor if slabs are mounted on yielding steel beams, whereby the additional stress due to the lateral bending of the slab reduces the shear load bearing capacity of the slab. Hereby, extra strengthening of the slab end portion can give the slab additional strength so that the slab can take the load imposed thereon.

Such use of higher-strength and fiber-reinforced concrete at the slab end portion removes the need for additional reinforcing steels at the support-load-bearing area of the slab, a possibility that in the slip-form casting technology has been almost impossible to implement without essentially degrading the cost-efficiency of mass production casting. Now the novel casting technology according to the invention increases the range of slab applications and thus improves the competitive edge of the entire manufacturing branch of concrete products.

One further benefit of the present method is its applicability to existing slipformer casting machines.

DETAILED DESCRIPTION OF THE DRAWING

Figure 1:
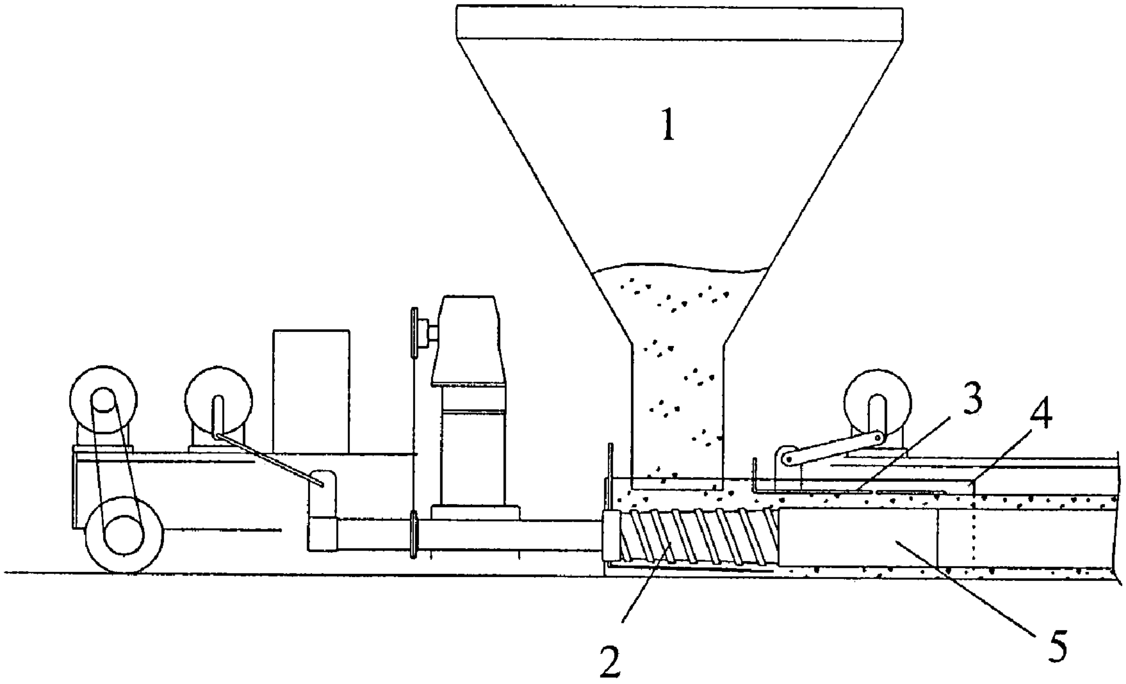
FIG. 1 shows a partially sectional view of a conventional slip-form casting apparatus.

Referring to FIG. 1, the apparatus shown therein is an extruder-type casting machine, wherein the concrete mix being cast flows from a feeder hopper 1 onto auger feeders 2, whose flights during the rotation of the augers propel the concrete mix into a casting mold formed by a top troweling beam 3 and side troweling beams 4. Immediately behind the auger feeders are mounted core-shaping mandrels 5 that shape the hollow-core cavities to be made in the hollow-core slab being cast.

The casting machine is adapted to travel along the length of the casting bed under the propulsion force imparted by the auger feeders, and the ready-cast product is left resting on the casting bed until cured.

In the method according to the invention, into the open-top feeder hopper 1 of the casting machine is metered a desired grade of concrete mix from above the machine. A concrete mixing station, wherein the concrete mix to be cast is prepared prior to pouring the mix into the feeder hopper of the casting machine, delivers predetermined amounts of a desired grade of concrete mix. The correct amounts of different grades of concrete mix can be computed on the basis of the cross section of the concrete product being manufactured and the predetermined length on the casting bed over which the concrete mix of desired grade is to be cast.

In the method, the progress of the casting machine travel is measured and, based on the measurement data, the location of the desired concrete mix batch as well as the correct delivery instant of the batch are determined. According to the method, also the amount of the concrete mix contained in the feeder hopper is monitored with the help of, e.g., load cells sensing the weight of the feeder hopper, whereupon this information is utilized to determine the incremental length that can be cast using the concrete mix batch contained in the feeder hopper. On the basis of these data, the correct delivery instant of the desired concrete mix batch and, respectively, the correct pouring instant of the concrete mix into the feeder hopper, can be determined accurately.

Conventionally, the delivery of the concrete mix batches from the concrete mixing station to the feeder hopper of the casting machine takes place by means of machinery adapted movable above the casting beds and the casting machines so that the concrete mix batch can be transferred from the stationary concrete mixing station to the moving casting machinery. By virtue of the data thus collected in the method, sufficient time reserve is assured for the delivery of a concrete mix batch at a correct instant of time provided that the location and travel speed of the casting machine plus the distance thereof from the concrete mixing station are known.

What is claimed is:

1. A method for manufacturing a concrete product in a substantially horizontal slip-form casting process using two or more different grades of concrete mix, in which method concrete mix is fed into a slip-form mold of a defined cross section moving progressively in the casting process so as to give a concrete product of a desired shape, whereby two or more different grades of concrete mix can be used in the product cast in accordance with the method wherein batches of the different concrete mix grades are metered in predetermined amounts into a feeder hopper of a slip-form casting machine at predetermined instants during progress of slip-form casting process, wherein at an instant of changing the grade of concrete mix, the feeder hopper of the casting machine still contains a certain amount of a preceding grade prior to delivery of a next grade of concrete mix into the feeder hopper, an amount of concrete mix remaining in the feeder hopper is measured, distance covered in casting is measured and the delivery of concrete mix is controlled based on the measurement results of the amount of remaining concrete mix and the distanced covered in casting.

2. The method of claim 1, wherein a desired grade of concrete mix is extruded into the entire cross section of the concrete product being manufactured.

* * * * *